Jan. 11, 1949.                    A. A. JOHNSON                    2,459,107
                         DRUM TYPE INDICATOR ALARM CLOCK
Filed Dec. 3, 1940                                              4 Sheets-Sheet 1
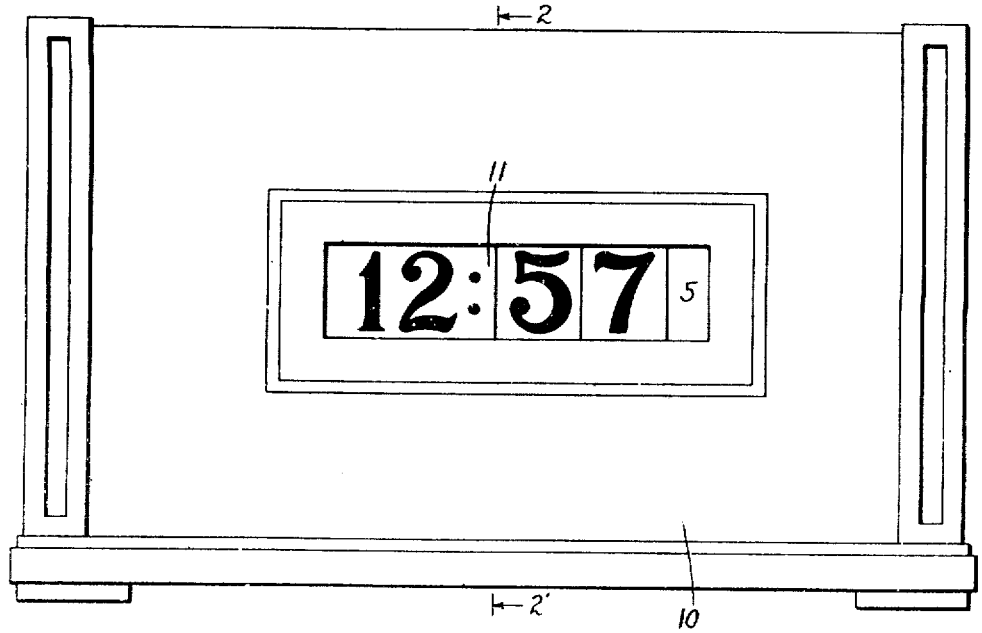
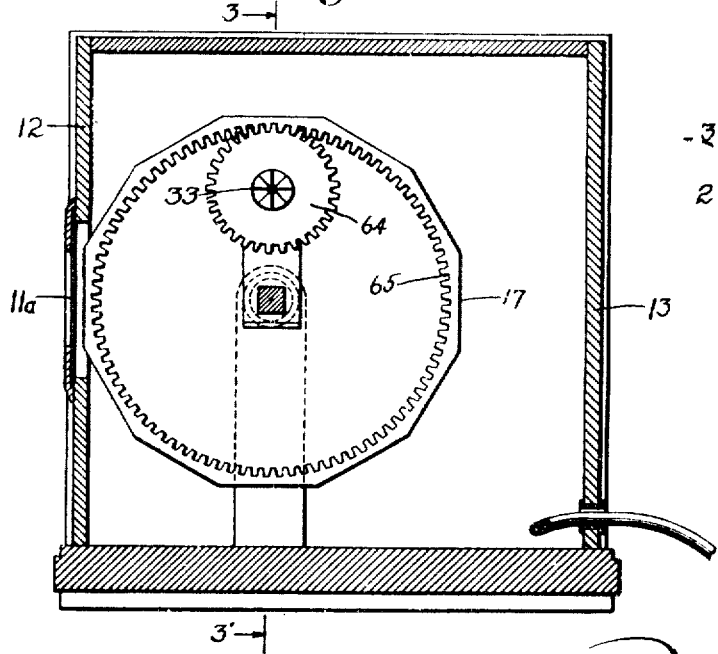
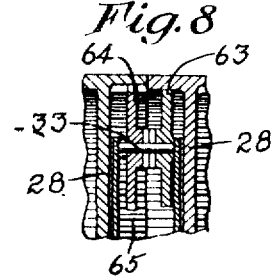
INVENTOR Jan. 11, 1949.   A. A. JOHNSON   2,459,107
DRUM TYPE INDICATOR ALARM CLOCK
Filed Dec. 3, 1940   4 Sheets-Sheet 2
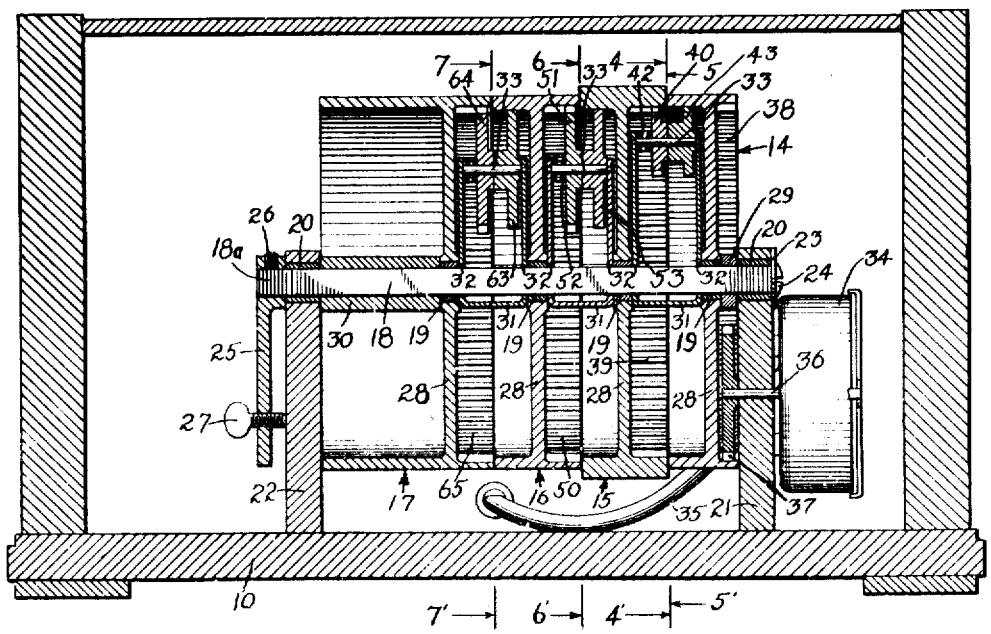
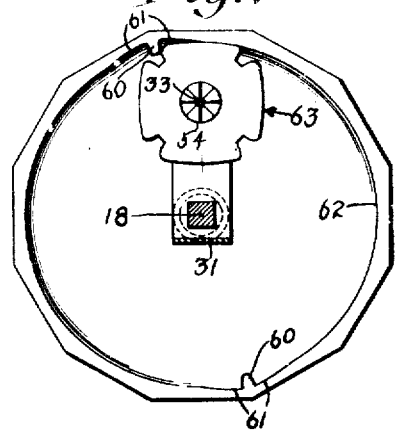
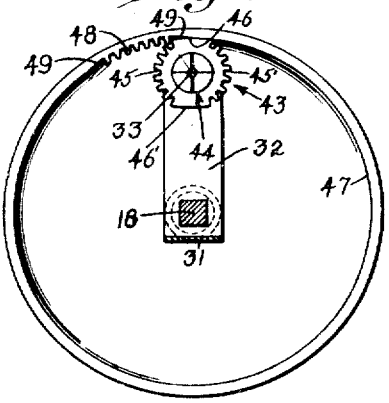
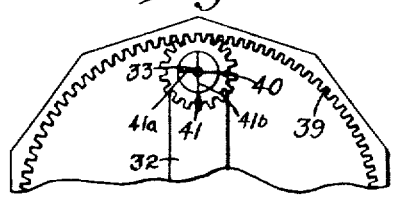
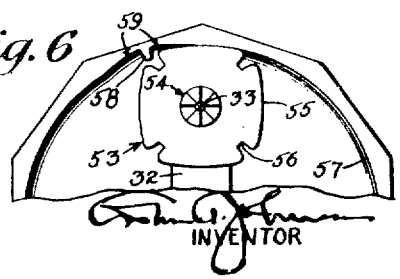

Jan. 11, 1949.  A. A. JOHNSON  2,459,107
DRUM TYPE INDICATOR ALARM CLOCK
Filed Dec. 3, 1940  4 Sheets-Sheet 3

INVENTOR

Jan. 11, 1949.  A. A. JOHNSON  2,459,107
DRUM TYPE INDICATOR ALARM CLOCK
Filed Dec. 3, 1940  4 Sheets-Sheet 4
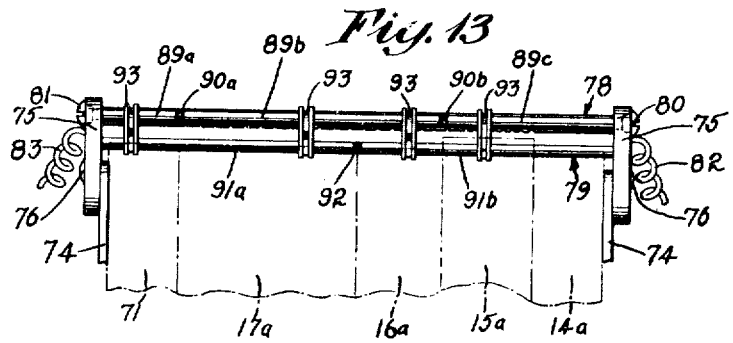
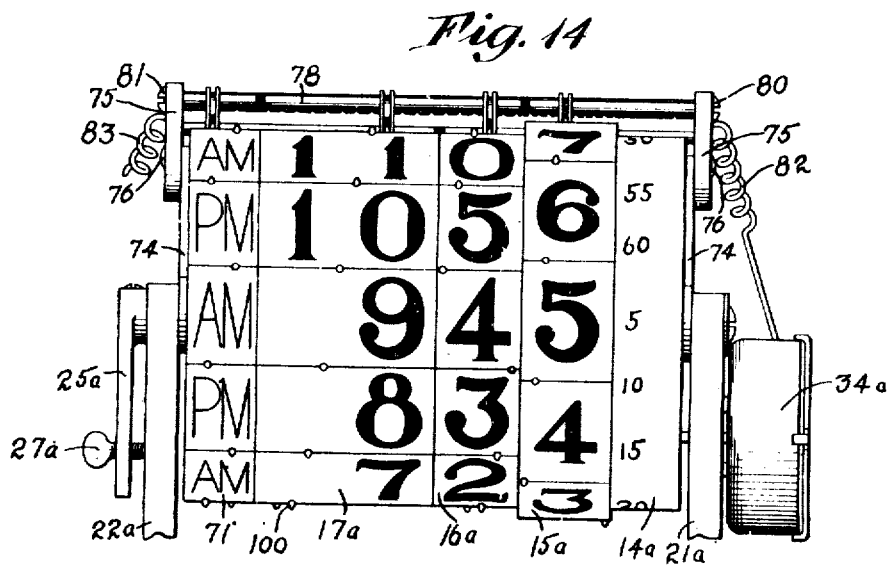
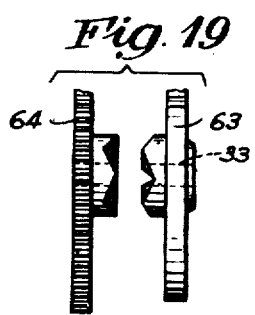
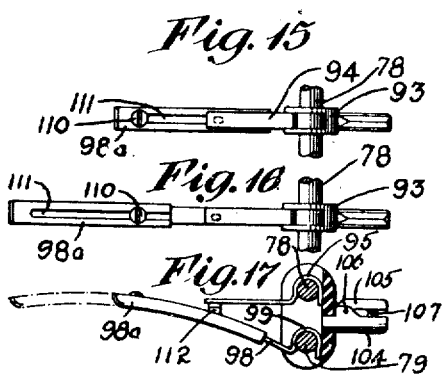
INVENTOR Patented Jan. 11, 1949

2,459,107

UNITED STATES PATENT OFFICE 2,459,107

DRUM TYPE INDICATOR ALARM CLOCK

Arthur A. Johnson, Bridgeport, Conn., assignor to Casco Products Corporation, Bridgeport, Conn., a corporation of Connecticut Application December 3, 1940, Serial No. 368,329

31 Claims. (Cl. 58—19)

The present invention relates to direct reading clocks, i. e. to those reading like a cyclometer.

It has been proposed heretofore to provide, as a carry-over mechanism between indicators of such clocks, a Geneva movement which has the advantages of eliminating the need for spring detents and the noise accompanying their operation, of preventing overthrow of the numeral wheels, and of preventing casual or accidental movement of the numeral wheels during the use of the clock.

However, in such prior proposals, the Geneva carry-over mechanisms are disposed exterior to the numeral wheels, requiring that the indicators be spaced apart so that the wheels may be geared to the Geneva mechanism. To conceal the gears separate sight windows are provided for some of the various wheels or indicators which show hours, minutes and tens of minutes, and as a result, the numerals do not appear together as they would, for example, on a printed sheet.

It is an object of the present invention to provide a direct reading clock using as the carryover mechanisms, intermittent mutilated gearing of the Geneva type, and yet having the numeral wheels juxtaposed substantially without intervening spaces, so that a straight and uninterrupted line of type appears through the sight opening. This is accomplished by providing Geneva carry-over mechanisms housed entirely within the wheels.

The conventional Geneva movement or Geneva stop comprises a pair of externally engaged rotary members. One member, namely, the driver, is provided with a convex peripheral surface concentric with its axis, which as it rotates, slidably engages successive concave peripheral surfaces on the other or driven member, locking the latter positively against rotation. During each revolution of the driver, a tooth or projection on its convex arcuate surface engages a recess between the successive concave arcuate portions of the periphery of the driven member, rotating the latter far enough to bring the next concave portion into engagement with the convex locking surface of the driver.

In the preferred carry-over mechanism of the present invention, the principle of operation is the same, but the two members engage each other internally, the driver being the larger of the two and having an arcuate concave surface, which, as it rotates, slidably engages successive convex peripheral surfaces on the other or driven member, retaining the latter positively against rotation in successive positions. During each revolution of the driver, a tooth or projection on its concave arcuate surface periodically engages a recess between the successive convex portions of the periphery of the driven member, rotating the latter far enough to bring the succeeding convex surface into engagement with the concave surface. This form of intermittent internal gearing is hereinafter referred to in the specification, and in the appended claims, as an "internal Geneva movement," the driven member being characterized as an "internal Geneva member," and the successively engaged convex peripheral surfaces of the latter as "internal Geneva segments."

The resulting mechanism rotates the driven member periodically, but locks it positively against movement between periodic operations. No detents are required, and, consequently, the necessary driving force is only that required to overcome friction and the slight inertia of the moving parts. Moreover, all of the cooperating portions of the peripheral surfaces of the internal Geneva member, as well as of the driver, may be constructed to lie in the same plane so that in manufacturing the mechanism, its parts may be stamped from sheet metal.

The numeral wheels are preferably mounted on a common shaft for coaxial rotation and accordingly have the same diameter. In order to facilitate this construction, a feature of the present invention is the provision, in a clock mechanism of the aforesaid type, of an improved carry-over mechanism of the internal Geneva type for moving the tens of minutes indicator one-twelfth of its circuit, while the adjacent minutes indicator moves one-tenth of its circuit.

For this purpose, the internal Geneva movement in the carry-over mechanism between the minutes and tens of minutes indicator may be of the type above-described, but the mechanism between the seconds drum, or timing device, and the minutes drum is modified by providing a series of teeth (constituting a sector gear) instead of a single tooth on the driver surface of the seconds indicator or timing device, which engages a corresponding sector gear between successive internal Geneva segments, on the internal Geneva member which controls the periodic advancement of the minutes indicator.

In prior proposals of clocks of this kind having a Geneva lock carry-over, it was necessary, in order to reset the clock to the correct time, to turn the lowest denomination wheel through revolution after revolution until by carry-over operations, all the wheels are properly positioned. This is a tedious and time-consuming task.

According to the present invention, this is avoided by providing means whereby the numeral wheels may be individually set by hand to the desired position, notwithstanding the fact that they are normally locked against casual or overthrow movement by the carry-over mechanism.

This is accomplished by the provision of a spring clutch in the carry-over mechanism between each of the wheels or drums, said spring clutch yielding resiliently to permit relative motion of adjacent drums by hand. The said spring clutches are so arranged that they are adapted to mesh only when the numerals adjacent the sight opening of the clock are in mutual alignment.

An advantageous feature of the construction herein disclosed, is that the entire mechanism is supported, as a unit, on and with a single shaft which may be shifted angularly around its axis so that the entire mechanism may be angularly shifted to register the line of numerals with a sight opening as located in the particular housing in which the mechanism is to be used.

A further feature of the present invention is the provision of an electric alarm mechanism for direct reading clocks which is easily set and does not require the clockwork alarm mechanism usually used with "dial" and "hand" clocks. According to the present invention, the alarm is controlled by the positions of the numeral wheels.

In the form of the invention illustrated herein, as exemplary hereof, a series of projections are helically disposed on the surfaces of the drums at angular intervals corresponding to the numerals thereof. These projections cooperate with a switch adjacent each drum which is laterally adjustable so that it may be in line with any desired projection, each switch being closed only when said projection reaches a predetermined position which corresponds to the positioning of the desired numeral at the sight opening. The switches are connected in series with a suitable electric alarm so that the latter is operative only when all of the switches are closed.

The alarm may be arranged to ring only as long as the minutes drum remains in the single position for which its switch is adjusted, that is, for about one minute. But, if desired, an extensible switch-actuating member may be provided to be engaged by the projections on the drum for closing the said switch and retaining it closed for two or more successive drum positions, so that the duration of the alarm signal may be prolonged to ring for two or more minutes. If desired, the switch for the minutes drum may be shunted out, in which case the alarm would be finally controlled by the tens of minutes drum and would be operative for ten minutes. However, in this case, the alarm could only be set to ring at ten minute intervals.

Preferably, the alarm switches are also supported in fixed angular position relative to the shaft which carries the numeral wheels and carry-over mechanism, so that when the angular position of the shaft is altered relative to its supports to register the numerals with the sight opening, the position of the alarm switches is correspondingly altered, maintaining their relation to the drums and carry-over mechanism unchanged.

Other features and advantages will appear from the following detailed description of specific embodiments of the present invention, referring to the accompanying drawings, in which:

Figure 1 is a front elevation of the direct reading clock of the present invention.

Fig. 2 is a vertical cross-section of the clock substantially along the line 2—2' of Fig. 1.

Fig. 3 is a cross-section substantially along the line 3—3' in Fig. 2.

Fig. 4 is a cross-section of the clock mechanism substantially along the line 4—4' in Fig. 3 in the direction of the arrows, showing a detail of the seconds drum, or flywheel, and a portion of the carry-over mechanism for driving the minutes drum.

Fig. 5 is a fragmentary detail of the minutes drum and a portion of the carry-over mechanism therefor, said view being a cross-section along the line 5—5' of Fig. 3 in the direction of the arrows.

Fig. 6 is a cross-section of the clock mechanism along the line 6—6' in Fig. 3, showing a fragmentary detail of the opposite side of the minutes drum.

Fig. 7 is a cross-section of the clock mechanism substantially along the line 7—7' of Fig. 3 and is a detail of the portion of the carry-over mechanism of the tens of minutes drum for driving the hour drum.

Fig. 8 is a fragmentary detail in cross-section substantially along the line 3—3' in Fig. 2, showing the carry-over mechanism between the tens of minutes drum and the hour drum during relative rotation of the drums for setting the clock.

Fig. 13 is a detail in front elevation of the alarm setting device of Fig. 10.

Fig. 14 is a view in front elevation of the alarm clock mechanism of Fig. 9.

Fig. 15 is a plan view of an extensible contact forming a portion of the alarm setting device of Fig. 9.

Fig. 16 is a similar view of the contact of Fig. 15 in extended position.

Fig. 17 is a side view of the contact of Figs. 15 and 16.

Fig. 18 is an enlarged cross-section through the end of the extensible contact member in Fig. 15.

Fig. 19 is an elevation of the driven and driving members of the carry-over device between the tens of minutes and hour drums showing the clutch members spread apart to illustrate their cooperating inclined-plane surfaces.

Figure 9:
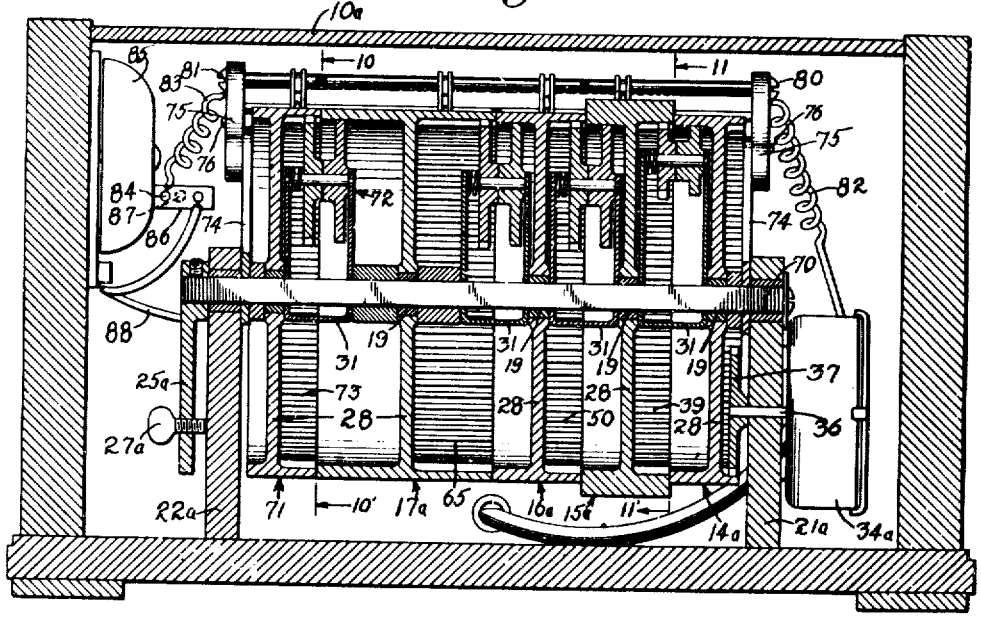
Fig. 9 is a vertical cross-section of an alarm clock embodying a modification of the mechanism of Fig. 2.

As illustrated in Figs. 1 to 8, the direct reading clock of the present invention comprises a casing 10 having a sight opening 11 in a lateral wall 12 thereof. The sight opening may be covered by means of a transparent window 11a. The opposite or rear wall 13 of the casing is removable for setting or adjusting the clock mechanism.

A series of coaxial drums of substantially the same radius are positioned behind the sight opening to permit observation of aligned portions of the peripheral drum surfaces.

Drum 14 at the right of said opening is a flywheel, motion of which indicates that the clock is operating, and may be graduated, if desired, in seconds or other fractional parts of a minute. The adjacent drum 15 to the left, bears numerals equally spaced around its periphery from 0 to 9, for indicating minutes. The third drum 16 bears numerals from 0 to 5 on each half of its periphery to indicate tens of minutes, said numerals being likewise equally spaced around the periphery thereof, and the fourth drum 17 at the extreme left bears likewise equally spaced numerals from 1 to 12 on its periphery for indicating hours.

In order to permit the aligned numeral bearing surfaces of the drums behind the sight opening 11 to present a substantially continuous appearance, the drums are mounted side by side with their edges substantially contiguous, the clearance between the drums being only sufficient to permit them to rotate independently.

The portions of the drum surfaces bearing each of the numerals may be flattened as shown in the drawing, the contour of the drums being rendered polygonal thereby, and preferably, the radius of the inscribed circle of each of the polygons is the same so that the aligned surfaces of the drums behind the sight window 11 present the appearance of a substantially continuous flat surface.

The drums are supported on a squared horizontal shaft 18 carrying cylindrical bushings 19 at suitably spaced intervals to form bearing surfaces for the drums. Cylindrical bushings 20 at opposite ends of the shaft 18 are journaled and supported in a pair of brackets 21 and 22 carried by a portion of the casing 10. The shaft 18 is retained at one end against axial displacement by a washer 23 engaging the bracket 21 and a set screw 24 to hold the washer in place, and at the opposite end, the said shaft is extended beyond the bracket 22, the extended portion 18a being cylindrical and carrying a radial arm 25 secured thereto by means of a set screw 26. A thumb screw 27 carried by the radial arm 25 engages the bracket 22 for retaining the shaft 18 against rotation. Upon loosening the thumb screw 27, the shaft 18 may be rotated for adjustment of its angular position, and secured in the desired adjusted position by retightening the thumb screw.

The drums are hollow except for a substantially central web 28 in each drum which engages the corresponding cylindrical bushing 19 and supports the drum for rotation about the axis of the shaft 18. Means for spacing the drums on the shaft 18 comprise collars 29 and 30 carried by the shaft 18 between the bearings of drums 14 and 17 and brackets 21 and 22. Between the bearings of each pair of adjacent drums, the shaft 18 carries a U-shaped yoke 31, the arms 32 of which extend radially outward in the hollow portions of the adjacent drums, the yokes serving to space the adjacent drums one from the other. The yokes engage the shaft 18 by means of squared holes so that they are retained against angular displacement around the shaft, and the arms 32 of each yoke support a bearing shaft 33 for the carry-over mechanism which transmits the motion of one drum to the next.

A clockwork or timing mechanism, shown as a synchronous electric motor 34 for operating the direct reading clock, is mounted on the bracket 21 and is connected by means of an electric cord 35 to a suitable A. C. power supply. The drive shaft 36 of the motor extends through the said bracket and carries a pinion 37 engaging a ring gear 38 on the inner surface of the adjacent seconds drum 14.

The gear ratio of the pinion 37 to said ring gear is preferably such that the drum makes one revolution per minute during operation of the motor 34, so that the drum 14 may be calibrated in seconds or fractional parts of a minute. As shown in the drawing, the drive shaft 36 and pinion 37 make three revolutions per minute and the ratio of the pinion to the ring gear is 1:3.

The minutes drum 15, as hereinbefore stated, bears ten numerals from 0 to 9 equally spaced around its periphery. Each time the seconds drum 14 makes one revolution, it is desired to advance the minutes drum 15 by one-tenth of a revolution during a short interval of each revolution of the drum 14.

For this purpose, the inner annular surface of the minutes drum 15 facing the seconds drum 14 is provided with a ring gear 39 which is engaged by a pinion 40 rotatably carried by the bearing shaft 33 of the yoke 31 between drums 14 and 15. The ratio of the pinion 40 to the ring gear 39 is preferably 1:5 so that for each half revolution of the former, the drum 15 is advanced by one-tenth of a revolution, that is, through an angle sufficient to advance each numeral from one position to the next corresponding position.

The face 41 of the hub of pinion 40, which extends toward drum 14, is radially fluted as shown in Fig. 5 having two diametrically opposite high points 41a, and two corresponding depressions 41b. A compression spring 42 positioned on the bearing shaft 33 between one leg of the yoke 31 and the adjacent face of the pinion 40 urges the latter against an internal Geneva member 43, also rotatably carried by the shaft 33, for intermittently transmitting the motion of the seconds drum 14 to the pinion 40.

The fluted hub face 41 of pinion 40 meshes with the correspondingly fluted hub face 44 on the internal Geneva member 43, forming a spring clutch having two diametrically opposite meshed positions.

According to the present invention, the said spring clutch permits the drum 15 to be rotated by hand independently of the internal Geneva member 43 for setting the minutes drum 15 of the clock, the spring 42 yielding as the fluted faces 41 and 44 are rotated relative to each other.

By constructing the hub faces with only two diametrically opposite meshed positions, and arranging the gear ratio of the ring gear 39 to the pinion 40 so that a half revolution of the latter will advance the numerals of the drum 15 from one position to the next corresponding position, said hub faces are meshed only when the numeral faces of the drum 15 are in successive corresponding positions, assuming that the internal Geneva member 43 is in one or the other of two diametrically opposite positions.

In order to advance the drum 15 one-tenth of a revolution for each revolution of the drum 14, the latter is adapted to cause the drive member or pinion 40 to rotate through one-half revolution for each revolution of the seconds drum 14. For this purpose, the Geneva member 43 is constructed as a combined internal Geneva and sector gear having oppositely disposed toothed sectors 45 and 45' and oppositely disposed internal Geneva segments 46 and 46' on its peripheral surface. The latter, as shown, may each conveniently extend over an arc of about sixty degrees, while the former extend over an arc of about one hundred twenty degrees.

The inner annular surface of the drum 14 as illustrated in Fig. 4, comprises an arcuate surface 47 adapted to engage one or the other of the internal Geneva sectors 46 or 46' to lock the member 43 in one of two positions differing from each other by a half revolution. A sector of teeth 48 exceeding by one, the number of teeth in each of the sectors 45 and 45' and adapted to engage the latter, is formed at one point on the inner surface of the drum 14, interrupting the arcuate surface 47. Suitable recesses 49, equal in length to at least half of the internal Geneva segments 46 and 46' are provided at each end of the toothed sector 48 so that upon rotation of drum 14, the arcuate surface 47 will release the drive member 43 when the first tooth of the sector 48 engages the end of the internal Geneva segment, for instance, segment 46, and the teeth of sector 48 will mesh with the teeth of sector 45 to rotate the internal Geneva member. Arcuate surface 47 will then engage the opposite internal Geneva segment 46', again locking the internal Geneva member 43 in a position a half revolution in advance of the preceding locked position. Thus, for each revolution of the seconds drum 14, internal Geneva member 43 and pinion 40 are advanced a half revolution, and correspondingly, the minutes drum 15 is advanced one-tenth of a revolution.

The combined length of the sector 48 and the recesses 49 which interrupt the arcuate surface 47 is about thirty-six degrees or one-tenth of the periphery of the drum 14. With a sixty degree internal Geneva segment 46 and a one hundred twenty degree gear sector 45, the extent of the sector gear 48 is twenty-four degrees and each of the depressions 49 is six degrees. Hence, since rotation of the internal Geneva member 43 does not begin until one depression 49 has passed the leading edge of the internal Geneva segment, and is completed as the end of the other depression 49 has reached the midpoint of the other internal Geneva segment, each semirevolution of the internal Geneva member 43 occurs while thirty-six degrees or one-tenth of the periphery of drum 14 is passing over it.

Accordingly, since drum 14 rotates at the rate of one revolution per minute, drum 15 is advanced one-tenth of a revolution, bringing each of the numerals thereof into the next corresponding position, during six seconds of each minute.

If the ratio of ring gear 39 to pinion 40 multiplied by the number of meshing positions of the spring clutch joining pinion 40 and internal Geneva member 43 are equal to the number of faces or numerals on the drum 15, or to some multiple thereof, the clutch will be engaged as long as the internal Geneva member 43 is locked whenever the angularly spaced numerals on said drum reach successive corresponding positions during setting of the drum by hand. In order that the clutch may be engaged only when the said numerals reach corresponding successive positions, the product of said gear ratio and the number of clutch meshing positions is made equal to the number of faces or numerals on the drum 15.

Obviously, it is possible to construct pinion 40 and internal Geneva member 43 to perform a complete revolution for every tenth of a revolution of drum 15. In this case, the clutch between the hub faces 40 and 43 would be constructed to mesh in only one position instead of two, and only one internal Geneva sector 46 and gear sector 45 would be provided on the internal Geneva member 43.

As hereinbefore stated, drum 16 which indicates tens of minutes is provided with equally spaced numerals from 0 to 5, once repeated around its periphery, so that the total number of equally spaced numbers is 12.

In order that the drum 16 and drum 15 may cooperate to show consecutive numbers from 0 to 59, the former drum must be advanced one-twelfth of a revolution for each revolution of the drum 15, a complete revolution of drum 16 requiring two hours. For this purpose, the inner annular surface of drum 16 facing drum 15 is provided with a ring gear 50. A pinion 51, supported on the bearing shaft 33 carried by yoke 31 between drums 15 and 16, engages said ring gear, the ratio of the latter to the pinion 51 being 3:1. With this arrangement, the drum 16 is rotated through one-twelfth of a revolution for every quarter revolution of the pinion 51.

Figure 10:
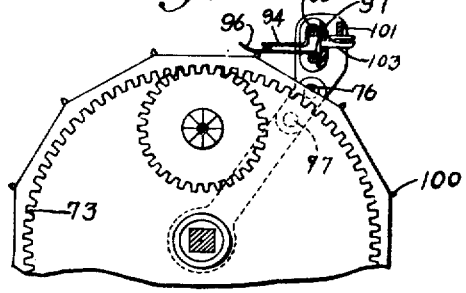
Fig. 10 is a fragmentary detail of the meridian drum of the clock mechanism of Fig. 9, including an alarm switch, and is a cross-section substantially along the line 10—10' of Fig. 9.
Figure 11:
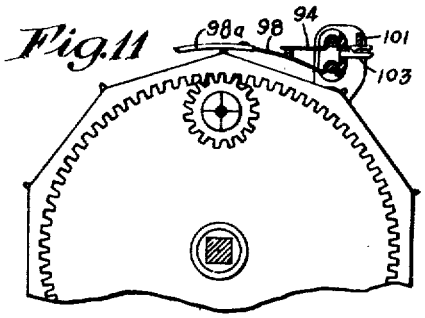
Fig. 11 is a fragmentary detail of the minutes drum of the mechanism of Fig. 9, showing the alarm switch associated therewith, and is a cross-section substantially along the line 11—11' of Fig. 9.

The face of the hub of pinion 51 is radially fluted having four high points, ninety degrees apart and four intermediate low points as shown in Figs. 10 and 19. The said pinion is urged by a compression spring 52, positioned between one leg of the supporting yoke 31 and the adjacent face of the pinion, against the hub of an internal Geneva member 53 also rotatably supported on the shaft 33. The internal Geneva member 53 is provided with a hub face 54 shaped in the same manner as hub face of the pinion 51 and engages the latter so that the internal Geneva 53 and the pinion 51 normally rotate together. If it is desired to rotate drums 15 and 16 relatively by hand for setting the clock, the high points of the respective hub faces 51 and 54 slip over each other as indicated in Fig. 8, reengaging, however, only when the numerals of one drum reach consecutive corresponding angular positions with reference to the numerals of the other drum. Thus, if the two drums and the carry-over mechanism between them are originally assembled so that the numeral faces are mutually aligned, they will remain so regardless of relative movement by hand of the two drums, since the spring clutch will only mesh when the original relation is reestablished.

The internal Geneva member 53 comprises a Maltese cross having four convex arcuate surfaces 55 separated by notches 56, said surfaces engaging and fitting the contour of the inner annular surface 57 of the drum 15 on the side facing drum 16, so that the internal Geneva is normally locked in one of its four positions by said engagement. At one point in the surface 57, a single tooth 58 is provided for engaging the notches 56 of the internal Geneva, and is flanked by recessed portions 59 on the inner surface of the drum in order to release the internal Geneva member 53 from the locking action of the arcuate surface 57. As the tooth 58 engages one of the notches 56, the said recesses will permit the internal Geneva member to rotate a quarter revolution as the tooth 58 passes over the Geneva member, i. e.—once for each revolution of drum 15. Thus during each revolution of the drum 15, which requires ten minutes in all, the drum 16 is advanced by one-twelfth revolution.

Drum 17 which indicates the hour, is provided, as hereinbefore stated, with numerals from 1 to 12 equally spaced around the periphery. Since drum 16 makes one revolution every two hours drum 17 must be advanced one-twelfth of a revolution for each half revolution of drum 16. For this purpose, a carry-over mechanism is provided between drums 17 and 16 which is similar in every respect to that between drums 15 and 16, with the exception that two diametrically opposite teeth 60, and corresponding flanking recesses 61, are provided on the inner annular surface 62 of drum 16.

As shown in Fig. 7, the four-leafed internal Geneva 63, similar to the internal Geneva 53 is supported on a bearing shaft 33 carried by the yoke 31 between the said drums, and is rotated through one quarter revolution for each half revolution of the drum 16. A pinion 64, like pinion 51 is also supported on the said shaft and engages a ring gear 65 provided on the inner annular surface of the drum 17 facing drum 16. The ratio of ring gear 65 to pinion 64 is 3:1 so that for each quarter revolution of the latter, the ring gear is advanced one-twelfth of a revolution, bringing each of its numerals into the next corresponding position. Since a full revolution of the drum 16 requires two hours, and since the teeth 60 are spaced apart by 180°, the advancement of drum 17 occurs once every hour.

In assembling the four drums and the interposed carry-over mechanisms, the teeth 58 and 60, and gear sector 48 are so aligned with the corresponding internal Geneva members 43, 53, and 63 that operation of the carry-over mechanisms between the drums 15, 16, and 17 will be simultaneous with that of the mechanism between drums 14 and 15.

The angular spacing of teeth 58 and 60 with reference to the numerals on drums 15, 16 and 17 and to the carry-over mechanisms between the said drums is such that the numeral-bearing faces of all three drums adjacent the sight opening 11 are in mutual alignment when the said drums are at rest. Moreover, the numerals on all of the drums are so spaced with reference to the teeth 58 and 60 and gear sector 48, and to the carry-over mechanisms between all of the drums, that periodic advancement of drums 15, 16, and 17 occurs when the highest numeral on the adjacent drum for indicating smaller time units is advanced beyond a position adjacent sight opening 11.

It will be observed that all of the drums as well as the carry-over mechanisms between them, may be rotated by turning the shaft 18 in the bearings carried by the brackets 20 and 21. By virtue of this feature, the radial arm 25, carried by the said shaft, may be used to adjust the aligned time-indicating numerals of the drums in alignment with the sight opening 11, the thumb screw 27 being tightened to secure the shaft 18 in the adjusted position. This is of material advantage when the position of the sight opening is not the same in all of the casings in which the clock mechanism is to be mounted, and renders accurate vertical positioning of the sight opening unnecessary.

It will also be observed that the maximum load on the motor 34, which occurs when all of the drums are simultaneously moved, is merely equal to the frictional resistance of the gear trains and internal Geneva drives, since the carry-over mechanisms include no detents. By suitable construction, this resistance may be rendered negligible, and hence the variation in motor load is relatively small and insignificant, and the operation of the clock is substantially noiseless.

By supporting the carry-over mechanisms entirely inside the drums on the central shaft, the drums may be mounted side by side without any substantial space between them, and they may be constructed to have substantially the same radius whereby they can be coaxially mounted.

A second embodiment of the invention is illustrated in Figs. 9 to 18, comprising a direct reading clock including an electric alarm attachment. The clock mechanism is substantially the same as in the case of the embodiment hereinbefore described, to the extent that it includes a seconds drum 14a, a minutes drum 15a, a tens of minutes drum 16a, and an hour drum 17a, with Geneva carry-over mechanisms between the said drums, all supported on a squared shaft 70 which is carried in bearings by brackets 21a and 22a. A driving motor 34a is provided for operating the clock mechanism in the manner hereinbefore described, and the shaft 70 is adjustable by means of a radial arm 25a carrying a thumb screw 27a.

The shaft 70, however, is longer than shaft 18, and carries an additional drum 71, mounted for rotation in the same manner as the other drums next to the hour drum 17a. Drum 71 is adapted to indicate the meridian, and is accordingly provided with twelve equally spaced indicia around its periphery consisting of alternate notations— A. M. and P. M.

A carry-over mechanism 72, similar to that between drums 16 and 17 is provided, cooperating with a single tooth on the drum 17a and with a ring gear 73 on drum 71, so that the latter is adapted to be advanced by a twelfth of a revolution for each revolution of the hour drum 17a. Accordingly, drum 71 is advanced a twelfth revolution every twelve hours, and is therefore adapted to indicate whether the time shown by the clock is A. M. or P. M., the alignment of the tooth on drum 17a being so arranged that advancement of the drum 71 occurs as the numeral 12 on drum 17a is advanced beyond a position adjacent the sight opening 11a. At each end adjacent the brackets 21a and 22a, the shaft 70 carries a pair of radial arms 74 for supporting the alarm control means. These arms are keyed to the shaft 70, so that they are retained against angular displacement relative to the shaft and the indicating mechanism carried thereby. Thus, in adjusting the angular position of the shaft and the indicating mechanism by means of the radial arm 25a, the alarm control means is simultaneously adjusted. At the ends of arms 74, a pair of extensions 75 of suitable insulating material is provided which is pivoted at 76 to the arms 74, but is normally retained in fixed position by a detent 77 as shown in Fig. 10.

The extensions 75 support a pair of parallel contact bars 78 and 79, terminal screws 80 and 81 being provided at opposite ends of the bar 78 on the outer surfaces of the extensions 75.

A lead or conductor 82 joins terminal 80 with one pole of an electric current supply, while the opposite terminal 81 is joined by a lead 83 to one terminal 84 of an electric alarm 85 secured to one wall of the casing 10. The alarm 85 is connected through a switch 86, operated by a handle 87 accessible on the exterior of the casing 10a by means of a lead 88 to the other pole of the electric current supply. Thus, when the switch 86 is closed, establishment of a circuit between the ends of the bar 78 is adapted to ring the alarm.

The bar 78 is not a continuous conductor, but is separated into three conducting segments 89a, b, and c, by insulating separators 90a, 90b aligned respectively with the adjacent edges of meridian drum 71 and hour drum 17a and with the adjacent edges of tens of minutes drum 16a and minutes drum 15a. The other bar 79 is divided into two conducting sections 91a and 91b, by an insulating separator 92 aligned with the adjacent edges of the hour drum 17a and the tens of minutes drum 16a. Four links 93 of insulating material are slidably carried by the bars 78 and 79, and each of the links carries switch means for establishing an electric circuit from one bar to the other. The said links are adjusted respectively opposite drums 15a, 16a, 17a, and 71. Thus, when the switch means carried by all of the links are simultaneously in circuit-closing position, a circuit is closed between terminals 80 and 81 and if the switch 86 is closed, the alarm 85 will ring. The said circuit between terminals 80 and 81 includes the successive segments 89a, 91a, 89b, 91b, and 89c of bars 78 and 79.

The links 93 are of U-shaped cross-section as indicated in Fig. 15, the bars 78 and 79 passing through the arms of the U. Each link carries between its arms, a fixed contact strip 94, secured by means of an elbow 95 to the upper bar 78, and extending over the surface of the corresponding drum in the direction of rotation thereof.

Each of the links 93 above drums 71, 17a, and 16a, carries a movable contact strip 96, pivotally supported by the lower bar 79 by means of an elbow 97 extending between said bar and the midportion of the link 93, and the free end of said movable contact extends over the surface of the underlying drum, beneath the fixed contact 94. The movable contact strips 96 are adapted upon upward displacement to engage the corresponding fixed contact strips 94 to establish an electric circuit between the superposed conductor segments of bars 78 and 79. Normally, however, the movable strips 96 are held out of contact with arms 94 by gravity, their downward pivotal motion about the bar 79 being limited by engagement of ends of the elbows 97 with the midportions of the links 93.

The link 93 positioned over the minutes drum 15a, also carries a movable contact 98 pivotally supported in the same manner as the contacts 96 by means of an elbow 99 engaging the bar 79, said elbow performing the same function as elbow 97 described above. Contact 98 is likewise adapted, upon upward movement, to engage the corresponding fixed contact 94, but is arcuately curved as indicated in Fig. 17 about the axis of the shaft 70 as a center. Preferably, contact 98 is constructed to be extensible, a metal strip 98a telescoping with the main portion of said contact. The strip 98a substantially surrounds the contact strip 98 as indicated in Fig. 18, but is slotted as shown in Figs. 15 and 16, a set screw 110 carried by strip 98 and extending through the slot in strip 98a being provided to secure the said strip in extended or in telescoped position. The slot 111 extends to the inner end of the strip 98a in order to permit the latter to slide past the contact button 112 carried by the strip 98 when strip 98a is pushed inward toward elbow 99. By this arrangement, the original length of the contact may be substantially doubled at will.

It will be seen that the segments of the bars 78 and 79 in combination with fixed contacts 94 and movable contacts 96 and 98, constitute a series of switches, all of which must be closed in order to establish a circuit between the ends of the bar 78 for ringing the alarm.

Means for raising the contacts 96 and 98 to engage the corresponding fixed contacts 94 comprises a series of nibs or projections 100 carried by each of the drums at equally spaced intervals around the peripheral surfaces thereof, the spacing corresponding to that of the numerals or indicia on the drums. The ten nibs on the minutes drum 15a are arranged helically around the drum so that no two nibs are in mutual alignment. The twelve nibs on the tens of minutes drum 16a are arranged in two similar helices so that only diametrically opposite nibs are in mutual alignment. On the hour drum 17a, the twelve nibs are arranged in a single helix as in the case of drum 15a; while the meridian drum 71 is provided with twelve staggered nibs, alternate nibs being in mutual alignment.

The normal position and breadth of movable contacts 96 with respect to the nibs on drums 71, 17a and 16a, is such that when one of the nibs thereon moves below any one of the said contacts, as a result of one of the periodic advancements of the drum, the movable contact will be raised thereby into engagement with the corresponding fixed contact 94; but the succeeding advancement of the drum will cause the nib to release the contact, and interrupt the circuit.

When extension 98a is retracted, movable contact 98 is adapted to be actuated in a similar manner by the nibs of drum 15a, duration of the circuit closure being approximately one minute; but when the telescopic member 98a is extended, the nib will retain the contact 98 in raised position for two consecutive positions of the drums, duration of the circuit closure being about two minutes.

If desired, the switch controlled by the nibs on minutes drum 15a may be shunted, but in this case the alarm is controlled by the tens of minutes drum 16a, and could only be adjusted, to ring at ten-minute intervals, the duration of the signal being substantially ten minutes.

As hereinbefore stated, the links 93 are slidable on bars 78 and 79, and the movable contacts 96 and 98 are sufficiently narrow, that when aligned with one nib, or set of aligned nibs, on the respective underlying drums, the other nibs will be ineffective to raise the said contacts. Thus, by adjusting the lateral position of the links 93 on bars 78 and 79, engagement of fixed contacts 94 with movable contact members 96 and 98 may be arranged to occur when any selected numeral or meridian designation of the various drums reaches the sight opening of the casing. Since simultaneous closing of all of the movable contacts closes an electric circuit from the terminal 80 to terminal 81, lateral adjustment of the links 93 may therefore be used to set the alarm to ring at any given minute within twenty-four hours.

The helically arranged nibs on numeral-bearing drums 17a, 16a, and 15a are preferably disposed so that the terminal nib of any helix, that is, the nib at one extreme side of a drum, will be positioned to engage the movable contact 96 or 98 when the lowest numeral of said drum, for instance, 0 or 1, is positioned at the sight opening of the clock. By virtue of this arrangement, the successive settings of each of the links 93 from one side to the other of the respective underlying drums will advance the setting of the alarm by one time unit as indicated by each drum.

According to the resent invention, means is also provided for indicating the adjustment of each link 93 and for retaining the links in each desired position of adjustment. Such means comprises, for instance, a scale 101 mounted adjacent and parallel to bars 78 and 79. The scale is inscribed with numerals and meridian designations so distributed that when a link 93 is positioned at one of said notations, the contacts carried thereby will be engaged by a nib on the underlying drum, when the same numeral or meridian designation is positioned at the sight opening of the clock.

The said scale is also provided with notches 102 corresponding to each of the notations on its surface, and the links 93 are each provided with a releasable detent mechanism 103 for engaging said notches. The detent mechanism comprises a fixed arm 104 projecting below the scale 101, and carrying a movable arm 105, pivoted at 106, for engaging the notches. A compression spring 107 urges the arms 104 and 105 apart so that the latter is yieldably held in engagement with the notches.

When it is desired to adjust the setting of links 93, bars 78 and 79, and scale 101 are tilted backward, extensions 75 pivoting about the pivots 76 to raise the contacts carried by links 93 out of engagement with the drums.

Each of the links 93 is then slid along the bars 78 and 79 to the desired position indicated on the scale 101, the detent 103 being compressed in each case to release it from notches 102. Upon releasing bars 78 and 79, detent 77 returns the latter together with the scale 101 to their original positions above the underlying drums.

Figure 12:
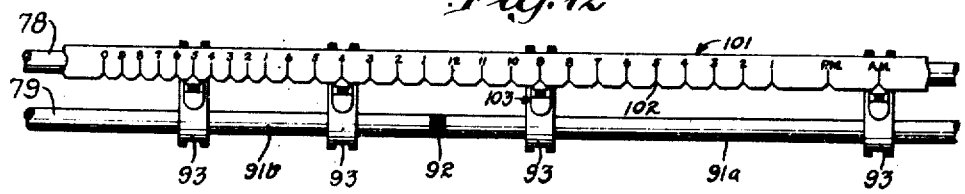
Fig. 12 is a detail in rear elevation of the alarm setting device of the clock of Fig. 9.

The links 93, as shown in Fig. 12, are adjusted to cause the alarm to ring at 9:45 A. M. As long as drum 71 indicates A. M. at the sight window of the clock, the switch carried by the link 93 above said drum will be held in circuit-closing position by one of the nibs on said drum, said circuit closure being maintained for twelve hours in each twenty-four. Similarly, as long as the numeral 9 on the hour drum 17a is opposite the sight window 11a, the contacts carried by link 93 above the said drum will be engaged, said engagement being maintained for one hour during each twelve. As long as the numeral 4 on the tens of minutes drum 16a is opposite the sight window, that is, for ten minutes during each hour, the contacts carried by the corresponding link 93 will be closed by one of the nibs in the said drum, and finally, if the extensible and movable contact 98 is in retracted condition, the switch above minutes drum 15a will be closed for about one minute in every ten, while the numeral 5 on the said drum is adjacent the sight opening. Thus, at 9:45 A. M. all of the switches will be closed, and the alarm will ring for about a minute.

If, however, the contact 98 is extended as hereinbefore described by sliding the telescopic extension 98a outward, the switch controlled thereby will be closed for two consecutive minutes during each ten minute period. That is, if the link 93 is set for 5, the switch will be closed while the numerals 5 and 6 are positioned at the sight opening of the clock, and the alarm will then ring for about two minutes before it is shut off by advancement of drum 15a. If the switch controlled by minutes drum 15a is shunted out, the alarm would then ring at 9:40 A. M. and shut off at 9:50 A. M.

By moving switch 86 to open-circuit position, the alarm may be shut off at any time, or rendered inoperative.

For setting the clock in the case of both embodiments, the rear wall of the casing is removed and the drums are each moved to the desired position so that the time indicated at the sight opening is correct. The motor or clockwork 34 or 34a is then started and the rear of the casing is replaced.

In the alarm clock, the scale 101 faces the rear of the clock, and hence may also be conveniently set to ring at any desired minute of the twenty-four hours upon removing the rear wall of the casing.

Variations and modifications may be made within the scope of this invention and portions of the improvements may be used without others.

I claim:

1. In a time-indicating device, an indicating mechanism driven by a timing mechanism, said indicating mechanism comprising a plurality of rotary members bearing time-indicating indicia on their peripheral surfaces; a shaft supporting said members for coaxial rotation; carry-over mechanisms supported by said shaft in fixed angular relation thereto for transmitting the motion of one rotary member to the next in such a manner that aligned indicia on the surfaces of said rotary members at a predetermined angular position relative to said shaft indicate the time in hours, and minutes; support means for said shaft; and means for adjusting the angular position of said shaft and the mechanism carried thereby relative to said support means and for securing it in adjusted position.

2. In a time-indicating device having a clock driving mechanism, an indicating mechanism driven thereby comprising a supporting shaft; a plurality of hollow rotary members mounted for mutually independent rotation on said shaft; indicating means carried respectively by the peripheries of said rotary members, transversely aligned portions of said means at a predetermined angular position relative to said shaft indicating the time in hours and minutes; means for periodically advancing said rotary members in mutually timed relation comprising carry-over mechanisms mounted upon said shaft in fixed angular position relative thereto between said rotary members, and driving means carried by said rotary members cooperating with the carry-over mechanisms; a housing having a sight opening enclosing said clock mechanism, said sight opening being disposed adjacent to said time-indicating means; rotatably adjustable means for supporting the shaft within said housing; and means for adjusting the angular position of said shaft, and the clock mechanism carried thereby, to bring the aligned time-indicating portions of said indicating means into registration with the sight opening of said housing, and for securing the shaft in adjusted angular position.

3. In a cyclometer clock having a plurality of rotary members, periodically driven by a timing mechanism, and bearing time-indicating indicia at equally spaced angular intervals on their peripheral surfaces, carry-over mechanisms for periodically transmitting motion of one rotary member to the next in such a manner that the indicia in predetermined angular positions on said members indicate the time in hours and minutes; normally engaged clutch means included in the carry-over mechanisms, said clutch means being adapted to be engaged only when the spaced indicia on one of said rotary members occupy one of their successively spaced angular positions relative to the indicia on the adjacent rotary members; resilient means for urging said clutch means into engagement, the said resilient means yielding to disengage said clutch means, and to permit relative rotation of said members in either direction by hand for setting the clock, and said resilient means automatically reengaging said clutch after the clock has been set.

4. In a time-indicating device having a plurality of substantially hollow rotary drums of substantially the same radius carried side by side coaxially on a normally fixed shaft, the edges of the peripheral surfaces of said drums being substantially contiguous, at least three adjacent drums being rotated intermittently by a timing mechanism, and having indicia on their peripheral surfaces to indicate the time in minutes, tens of minutes and hours respectively; a plurality of carry-over mechanisms for driving said drums and for transmitting the motion of one drum to the next, each of said mechanisms comprising a support mounted in fixed angular position on the shaft intermediate the timing mechanism and one drum, and intermediate adjacent pairs of drums; an internal Geneva member rotatably carried by said support and radially spaced from the fixed shaft; means on the inner annular surface of the adjacent more rapidly rotating drum for intermittently advancing said internal Geneva member and for locking it in successive angular positions between said advancements; a pinion rotatably carried by said support, and coaxial with said internal Geneva member; a slip clutch for coupling said pinion to said Geneva member; resilient means normally urging said clutch into engagement and yielding to release said clutch when the drums are rotated by hand relative to each other in either direction for setting the clock; and a ring gear on the inner surface of the adjacent slower moving drum engaging said pinion for effecting advancement of the other drum by equal angular distances in timed relation with the more rapidly moving drum.

5. An internal Geneva movement for actuating a driven member to perform a half revolution for each revolution of a driving member, comprising an internal Geneva member having a pair of convex arcuate segments disposed on opposite sides of the axis thereof; a pair of gear sectors disposed on opposite sides of the said axis complementing the said arcuate segments; and a rotary driving member having a concave annular surface concentric with its axis, cooperating with said segments to lock said internal Geneva member in one of two positions, differing by a half revolution; and a sector of teeth interrupting said concave annular surface for engaging said gear sectors on the internal Geneva member during each revolution of the driving member to move the opposite segment into locking relation with said inner annular surface.

6. In a time-indicating device, a continuously rotated drum bearing indicia on its peripheral surface for indicating seconds; a drum rotatably mounted coaxially with said seconds drum and bearing ten equally spaced indicia on its peripheral surface for indicating minutes; a carry-over mechanism between said drums for moving the minutes drum in timed relation with the seconds drum, said carry-over mechanism comprising an internal Geneva member adapted to be rotated intermittently through a half revolution for each revolution of said seconds drum; a pinion coupled with said internal Geneva member; and a ring gear carried by said minutes drum and engaged by said pinion, the ratio of said pinion to said ring gear being 1:5, said mechanism being adapted to advance said minutes drum one-tenth of a revolution for each revolution of said seconds drum.

7. In a time-indicating device, a rotary drum having time-indicating indicia on its peripheral surface; means for advancing said drum periodically, said advancement moving each of the indicia into successive corresponding positions; a second drum coaxially mounted for rotation adjacent the first drum and bearing twelve indicia on its peripheral surface; a carry-over mechanism between the drums for transmitting motion of the first drum to the second drum so as to advance the latter periodically by increments of one-twelfth of a revolution in timed relation with the first drum, comprising an internal Geneva member having four equally spaced convex Geneva segments separated by a corresponding number of notches; a concave annular surface on the first drum, concentric with its axis, engaging one of the said Geneva segments to retain the internal Geneva member in locked position; a tooth interrupting said annular surface for engaging said notches as the first drum rotates to move the successive internal Geneva segments into locking position with said surface; a pinion coupled with said internal Geneva member; and a ring gear on the second drum engaging said pinion, the ratio of the pinion to the ring gear being 1:3.

8. In combination with a direct reading clock having a plurality of rotary drums arranged side by side for coaxial rotation, and bearing time-indicating indicia on their peripheral surfaces, enclosed in a housing provided with a sight opening, and having means for moving the drums intermittently in timed relation so as to indicate the time by means of the indicia on the peripheral surfaces of said drums aligned with the sight opening, an alarm attachment comprising a plurality of adjustably movable switches, one for each drum, connected in series; an electric alarm connected in series with said switches; a plurality of switch-closing means carried on the peripheral surfaces of said drums at angular intervals corresponding to the num at angular intervals corresponding to the number of indicia carried by each drum and arranged so that only the switch-closing means corresponding to like indicia on the same drum are in mutual alignment, said switches being adapted in any one position to be actuated only by the aligned switch-closing means; and means for adjusting the position of said switches with reference to said drums so that all of the switches will be closed only when a preselected set of indicia appears at the sight opening in the clock.

9. In combination with a direct reading clock having a plurality of rotary drums arranged side by side for coaxial rotation and bearing time-indicating indicia on their peripheral surfaces, enclosed in a housing providing with a sight opening, and having means for moving the drums periodically in timed relation so as to indicate the time by means of the indicia on the peripheral surfaces of said drums aligned with the sight opening; an alarm attachment comprising a plurality of adjustably movable switches, one for each drum, connected in series; an electric alarm connected in series with said switches; a plurality of projections on the peripheral surfaces of said drums at angular intervals corresponding to the number of indicia carried by each drum and helically arranged so that only projections corresponding to like indicia on the same drum are in mutual alignment; a laterally adjustable actuating arm carried by each of said switches and actuated by engagement with said projections to close the switch associated therewith, said actuating arms being respectively adapted in any position of adjustment to be engaged only by the aligned projections of the corresponding drum; and means for adjusting the position of said switch-actuating arms so that all of the switches will be simultaneously closed only when a preselected set of indicia appears at the sight opening in the clock.

10. In combination with a direct reading clock having a plurality of rotary drums arranged side by side for coaxial rotation, and bearing time-indicating indicia on their peripheral surfaces, enclosed in a housing provided with a sight opening, and having means for moving the drums intermittently in timed relation so as to indicate the time by means of the indicia on the peripheral surfaces of said drums simultaneously aligned with the sight opening, an alarm attachment comprising a plurality of adjustably movable switches, one for each drum, connected in series; an electric alarm connected in series with said switches; a plurality of switch-closing means on the peripheral surfaces of said drums at angular intervals corresponding to the number of indicia carried by each drum and helically aranged so that only the switch-closing means corresponding to like indicia on the same drum are in mutual alignment, said switches being adapted in any one position to be actuated only by the aligned switch-closing means; means for adjusting the position of said switches with reference to said drums so that all of the swithces will be simultaneously closed only when a predetermined set of indicia appears at the sight opening in the clock; and means for retaining said switches in the adjusted positions comprising a detent carried by each switch, a graduated scale for indicating the position of each switch, said scale having a notch corresponding to each position of adjustment of the respective switches for releasably engaging said detent means.

11. In a cyclometer clock having a plurality of rotary members periodically driven by a timing mechanism and having time-indicating indicia on their peripheral surfaces; a shaft supporting said members for coaxial rotation; carry-over mechanisms supported by said shaft in fixed angular relation thereto, for transmitting the motion of one drum to the next, the aligned indicia on said rotary members being in fixed angular position relative to said shaft indicating the time; an alarm device; control means for energizing the alarm device, said means being supported by said shaft in fixed angular relation relative thereto, said control means being adapted to energize the alarm device upon each of said members simultaneously attaining a predetermined angular position relative to said shaft; means for adjusting said control means to select the angular positions of said rotary members at which the alarm device is energized; means for supporting said shaft; and means for adjusting the angular position of said shaft, and of the time-indicating mechanism and alarm control mechanism carried thereby, relative to said support means.

12. In an alarm clock as defined in claim 9, means for extending the actuating arm of the switch corresponding to the minutes drum to render it susceptible of engagement by one of said projections on said drum during the period when a plurality of successive numerals of said drum are positioned at the sight opening.

13. In a cyclometer clock having a plurality of rotary members, periodically driven by a timing mechanism, and bearing time-indicating indicia at equally spaced angular intervals on their peripheral surfaces, carry-over mechanisms for periodically transmitting motion of one rotary member to the next in such a manner that the indicia in predetermined angular positions on said members indicate the time in hours and minutes; normally engaged clutch means included in the carry-over mechanisms, said clutch means being adapted to be engaged whenever the spaced indicia on one of said rotary members occupy one of their successively spaced angular positions relative to the indicia on the adjacent rotary members; resilient means for urging said clutch means into engagement, said resilient means yielding to disengage the clutch means and permit relative rotation of said members in either direction by hand for setting the clock, and said resilient means automatically reengaging said clutch after the clock has been set.

14. In a time-indicating device having a plurality of substantially hollow rotary drums of substantially the same radius carried side by side coaxially on a normally fixed shaft, the edges of the peripheral surfaces of said drums being substantially contiguous, and at least three adjacent drums being rotated intermittently by a timing mechanism and having indicia on their peripheral surfaces to indicate the time in minutes, tens of minutes and hours respectively; a plurality of carry-over mechanisms for driving said drums and for transmitting the motion of one drum to the next, each of said mechanisms comprising a support mounted in fixed angular position on the shaft intermediate the timing mechanism and one drum, and intermediate adjacent pairs of drums; an internal Geneva member rotatably carried by said support and radially spaced from the fixed shaft; means on the inner annular surface of the adjacent more rapidly rotating drum for intermittently advancing said internal Geneva member and for locking it in successive angular positions between said advancements; a pinion rotatably carried by said support, and coaxial with said internal Geneva member; a slip clutch for coupling said pinion to said Geneva member comprising a pair of radially fluted clutch faces formed respectively on the Geneva member and the pinion and disposed for mutual engagement; yielding means for urging said clutch faces into engagement, said means yielding to disengage said clutch upon application of manual force to said drums to rotate one relative to the other in either direction; and a ring gear on the adjacent slower moving drum engaging said pinion for effecting advancement of the drum by equal angular distances in timed relation with the more rapidly moving drum.

15. In a cyclometer clock having a plurality of rotary members periodically driven by a timing mechanism and bearing time-indicating indicia at equally spaced angular intervals on their peripheral surfaces, indicia on the several rotary members simultaneously occupying predetermined angular positions indicating the time; an alarm signal; means engaged by said rotary members controlled by the angular position thereof for energizing said alarm signal when each of said members simultaneously attains a predetermined angular position; means for adjusting said control means to select the angular position of the rotary members at which actuation of the alarm signal occurs; and means for adjusting the extent of engagement of said control means with one of said rotary members for varying the duration of the alarm signal.

16. In combination with a direct reading clock having a plurality of rotary drums arranged side by side for coaxial rotation and bearing time-indicating indicia on their peripheral surfaces enclosed in a housing provided with a sight opening and having means for moving the drums periodically in timed relation so as to indicate the time by means of the indicia on the peripheral surfaces of said drums aligned with the sight opening, an alarm attachment comprising a plurality of switches connected in series with an electric alarm, said switches comprising a pair of bars supported adjacent to said drums and parallel to the axis thereof, said bars being divided into staggered conducting segments by insulating means aligned with the edges of adjacent drums; a plurality of contacts slidably carried by each of said bars; link means for aligning the contacts on one bar with those on the other bar, an aligned pair of contacts being disposed adjacent each drum, and each of said link means being laterally adjustable by sliding them on said bars; means normally holding the contacts of each bar apart; means for engaging said contacts respectively to establish a circuit between adjacent bar segments, comprising a plurality of projections carried by said drums at equally spaced angular intervals corresponding to the number of indicia carried upon the peripheral surface of each drum and helically arranged so that only the projections corresponding to like indicia on the same drum are in mutual alignment, simultaneous engagement of all of said contact pairs completing a circuit to energize said alarm, the aligned projections on the drums being adapted to close said switches respectively when the drum reaches a predetermined position, and the lateral adjustment of said links and said contacts with reference to said drums effecting simultaneous closure of all of the switches only when a predetermined set of indicia appears at the sight opening in the clock.

17. In an electric clock, a casing having a sight opening, a cyclometer type clock mechanism including a plurality of drums having time indicia thereon periodically aligned at a line of reading; a support therefor; and means for simultaneously angularly adjusting the mechanism relative to the support to vary the position of the line of reading with respect to the sight opening.

18. In an electric clock, a casing having a sight opening, a cyclometer type clock mechanism including a plurality of drums having time indicia thereon, and carry-over devices determining the position at which the indicia are periodically aligned at a line of reading; and means for simultaneously adjusting the positions of the carry-over devices to vary the position in which the drums are aligned thereby to relocate the line of reading with respect to the sight opening.

19. An electric alarm clock of the cyclometer type having a plurality of drums having time indicia thereon and switch operating means at predetermined positions therearound; means including timing mechanism for driving said drums in a predetermined cycle; an electrically operated alarm device; an actuating means therefor including a circuit and switch means therein to be controlled by preselected switch operating means thereon, said switch means being adjustable with respect to the drums to actuate the alarm at a predetermined time; and means including an element of the switch means adjustable in the direction of movement of the switch actuators for automatically controlling the length of time that the alarm is actuated.

20. An electric alarm clock of the cyclometer type having a plurality of drums having time indicia thereon and switch operating means at predetermined positions therearound; means including timing mechanism for driving said drums in a predetermined cycle; an electrically operated alarm device; an actuating means therefor including a circuit and switch means therein to be controlled by preselected switch operating means thereon, said switch means being adjustable longitudinally with respect to the drums to actuate the alarm at a predetermined time; and means including an element of the switch means adjustable circumferentially of the drums and engaged by the switch operating means for automatically and variably controlling the length of time that the alarm is actuated.

21. An electric alarm clock of the cyclometer type having a plurality of drums having time indicia thereon, and switch operating means at predetermined angular positions therearound and spaced longitudinally thereof including timing mechanism for driving said drums in a predetermined cycle to indicate time and carry-over mechanisms between the drums, said carry-overs having a yielding connection therein whereby the drums may be adjusted with respect to one another; an electrically operated alarm device; and an actuating means therefor including a circuit and switch means therein adjustable along said drums to a position in the path of movement of preselected switch operating means for actuation thereby.

22. In a device having a shaft; a plurality of hollow rotary members having indicia thereon and disposed side-by-side on the shaft for rotation thereon; means for driving one of said members; and Geneva-lock carry-over means interconnecting said members and including a part driven from one member and a part driving the next adjacent member, and clutch means releasably interconnecting said parts whereby said members may be adjusted with respect to one another to show the desired time.

23. In a device having a shaft; a plurality of hollow rotary members having indicia thereon and disposed side-by-side on the shaft for rotation thereon; means for driving one of said members; and Geneva-lock carry-over means interconnecting said members, said carry-over means each having two parts, one under control of the lower order member and the other controlling the higher order member and a separable connection between said two parts to permit the higher order member to be moved independently of the lower order member in setting the members to show the desired time, said separable connection including inclined planes whereby said parts may be connected together for simultaneous movement only when they bear predetermined angular relations to each other in which indicia on said higher and lower order members are aligned.

24. In a device having a shaft, a plurality of hollow rotary members having suitable indicia thereon disposed side-by-side on the shaft for rotation thereon; means for driving one of said members; and carry-over gears disposed within and interconnecting said members for driving the other members from the driven member, said carry-over means including yieldable clutch means between said gears whereby the interconnected members may be adjusted forwardly or backwardly with respect to one another.

25. In a device having a shaft, a plurality of hollow rotary members having suitable indicia thereon disposed side-by-side on the shaft for rotation thereon; means for driving one of said members; and carry-over gears disposed within and interconnecting said members for driving the other members from the driven member, said carry-over means including yieldable clutch means between said gears whereby the interconnected members may be adjusted forwardly or backwardly with respect to one another, said clutch means including aligning cam surfaces to cause the indicia on adjacent rotary members to automatically align after they are adjusted.

26. In a timing device, a shaft; a plurality of hollow rotary members disposed side-by-side on the shaft for rotation thereon, timing means for driving one of said members; and carry-over means disposed within and interconnecting said members for driving the other members therefrom, said carry-over means including means for normally locking the members against overthrow or casual movement, and yieldable means whereby either of the adjacent interconnected members may be adjusted with respect to the other by manual rotation thereof.

27. In a timing device, a shaft; a plurality of hollow rotary members disposed side-by-side on the shaft for rotation thereon; timing means for driving one of said members; and carry-over means interconnecting said members for driving the other members therefom, said carry-over means including friction clutch members urged into driving relation and yielding whereby the members may be adjusted relative to one another, said clutch members having cooperating driving faces shaped to assume a driving relation only when said rotary members are in a predetermined position.

28. In a timing device, a plurality of drums; means for driving said drums including timing mechanism and means for rotating said drums relative to one another at predetermined speed ratios; an electrically operated mechanism; a circuit for controlling said mechanism including at least one normally open switch means for each drum connected in series; and a plurality of switch-closing means disposed around each drum and displaced longitudinally on the drum in predetermined relation, the switch means for each drum being adjustable to preselect the switch-closing means for operation thereby whereby the mechanism will be operated when the preselected circuit-closing means of all of the drums are simultaneously moved into operative position.

29. In a timing device, a plurality of drums; means for driving said drums including timing mechanism and means for rotating said drums relative to one another at predetermined speed ratios including carry-over means having a yieldable connection whereby the drums may be adjusted with respect to one another; an electrically operated mechanism; a circuit for controlling said mechanism including at least one normally open switch means for each drum connected in series; and switch-closing means on each drum, the switch means for each drum being adjusted with respect thereto to preselect a switch-closing means thereon having a predetermined angular position on the drum whereby the mechanism will be operated when the preselected circuit-closing means of all of the drums are simultaneously moved into operative position.

30. In a timing device, a plurality of drums; means for driving the drums including timing mechanism and means for rotating said drums relative to one another at predetermined speed ratios; an electrically operated mechanism; a circuit for controlling said mechanism including conductor means extending along the drums and including at least two parallel sets of contacts, the contacts of each set extending in overlapped relation; normally open switch means for each drum movable over the contacts in predetermined relation with respect to said drums, said switch means being connected to a contact in each of said sets of contacts; and means on each drum for closing the normally open switch means, all of said switch means closing the circuit between the contacts of said two sets of contacts when the circuit-closing means of the drums are simultaneously moved into a predetermined operative position.

31. In a timing device, a plurality of drums; means for driving the drums including timing mechanism and means for rotating said drums relative to one another at predetermined speed ratios; an electrically operated mechanism; a circuit for controlling said mechanism including conductor means extending along the drums and including at least two parallel sets of contacts, the contacts of each set extending in overlapped relation; normally open switch means for each drum slidable over the contacts in predetermined relation with respect to said drums, said switch means being connected to a contact in each of said sets of contacts; a scale adjacent the contacts to indicate the time position of the switch means for each drum; and means on each drum for closing the normally open switch means, all of said switch means closing the circuit between the contacts of said two sets of contacts when the circuit-closing means of the drums are simultaneously moved into a predetermined operative position.

ARTHUR A. JOHNSON.

REFERENCES CITED

The following references are of record in the file of this patent:

UNITED STATES PATENTS

| Number | Name | Date |
|---|---|---|
| 352,257 | Nettekoven | Nov. 9, 1886 |
| 513,262 | Gerry | Jan. 23, 1894 |
| 937,919 | Bronson | Oct. 26, 1909 |
| 950,546 | Veeder | Mar. 1, 1910 |
| 1,127,491 | Mulligan | Feb. 9, 1915 |
| 1,195,494 | Nichols | Aug. 22, 1916 |
| 1,268,656 | Williford | June 4, 1918 |
| 1,430,364 | Evans et al. | Sept. 26, 1922 |
| 1,577,069 | Olsen | Mar. 16, 1926 |
| 1,908,424 | Hill | May 9, 1933 |
| 1,909,740 | Zubati | May 16, 1933 |
| 1,990,645 | Greenawalt | Feb. 12, 1935 |
| 2,001,195 | Horwitt et al. | May 14, 1935 |
| 2,114,501 | Oswald | Apr. 19, 1938 |

Certificate of Correction

Patent No. 2,459,107. January 11, 1949.

ARTHUR A. JOHNSON

It is hereby certified that errors appear in the printed specification of the above numbered patent requiring correction as follows:

Column 12, line 72, for the word "resent" read *present*; column 16, line 47, claim 8, strike out "at angular intervals corresponding to the num-";
and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*